United States Patent [19]
Ishii

[11] Patent Number: 6,047,019
[45] Date of Patent: Apr. 4, 2000

[54] RECEIVER FOR SPECTRUM SPREAD COMMUNICATION SYSTEM

[75] Inventor: Satoru Ishii, Mobara, Japan

[73] Assignee: Futaba Denshi Kogyo K.K., Mobara, Japan

[21] Appl. No.: 08/715,912

[22] Filed: Sep. 19, 1996

[30] Foreign Application Priority Data

Sep. 20, 1995 [JP] Japan ..................................... 7-264630

[51] Int. Cl.[7] .............................. H04B 15/00; H04K 1/00; H04L 27/30
[52] U.S. Cl. ........................... 375/206; 375/200; 375/347; 375/349; 375/267; 370/335; 370/342; 343/703; 343/725; 455/134; 455/500; 455/504; 455/506; 455/63; 455/65
[58] Field of Search ...................................... 375/200, 206, 375/340, 347, 267, 349; 370/335, 342, 229; 343/700 R, 703, 725; 455/10, 33.2, 52.3, 52.1, 59, 68, 70, 134, 500, 504, 506, 63, 65

[56] References Cited

U.S. PATENT DOCUMENTS

| | | |
|---|---|---|
| 4,704,734 | 11/1987 | Menich et al. .............................. 455/33 |
| 5,109,390 | 4/1992 | Gilhousen et al. ...................... 375/200 |
| 5,203,027 | 4/1993 | Nounin et al. ........................... 455/134 |
| 5,233,626 | 8/1993 | Ames ....................................... 375/200 |
| 5,577,031 | 11/1996 | Smith ....................................... 370/229 |
| 5,608,410 | 3/1997 | Stilp et al. ............................... 342/387 |
| 5,671,221 | 9/1997 | Yang ........................................ 370/320 |
| 5,691,974 | 11/1997 | Zehavi et al. ............................ 370/203 |
| 5,710,768 | 1/1998 | Ziv et al. .................................. 370/342 |
| 5,757,845 | 5/1998 | Fukawa et al. ........................... 375/200 |
| 5,799,010 | 8/1998 | Lomp et al. .............................. 370/335 |

*Primary Examiner*—Stephen Chin
*Assistant Examiner*—Michael W. Maddox
*Attorney, Agent, or Firm*—Oblon, Spivak, McClelland, Maier & Neustadt, P.C.

[57] ABSTRACT

A receiver for a spectrum spread communication system capable of eliminating a deterioration in receive quality due to fading by multipass. A signal of which a spectrum is spread by a direct spread modulation system is transmitted from a transmit side unit. A receive side unit is provided with a plurality of receive antennas, through which receive signals are fed to receiver circuits, followed by conversion of each of the signals into an intermediate frequency signal. Then, the signal is fed to a signal intensity measurement circuit and sampled by a clock n (n: an integer) times as high as a chip frequency, resulting in an intensity thereof being measured. Depending on results of the measurement, a selection signal is fed to a path switching circuit, resulting in one of outputs of the receiver circuits being selected, which is then fed to a direct spread demodulation circuit.

2 Claims, 6 Drawing Sheets

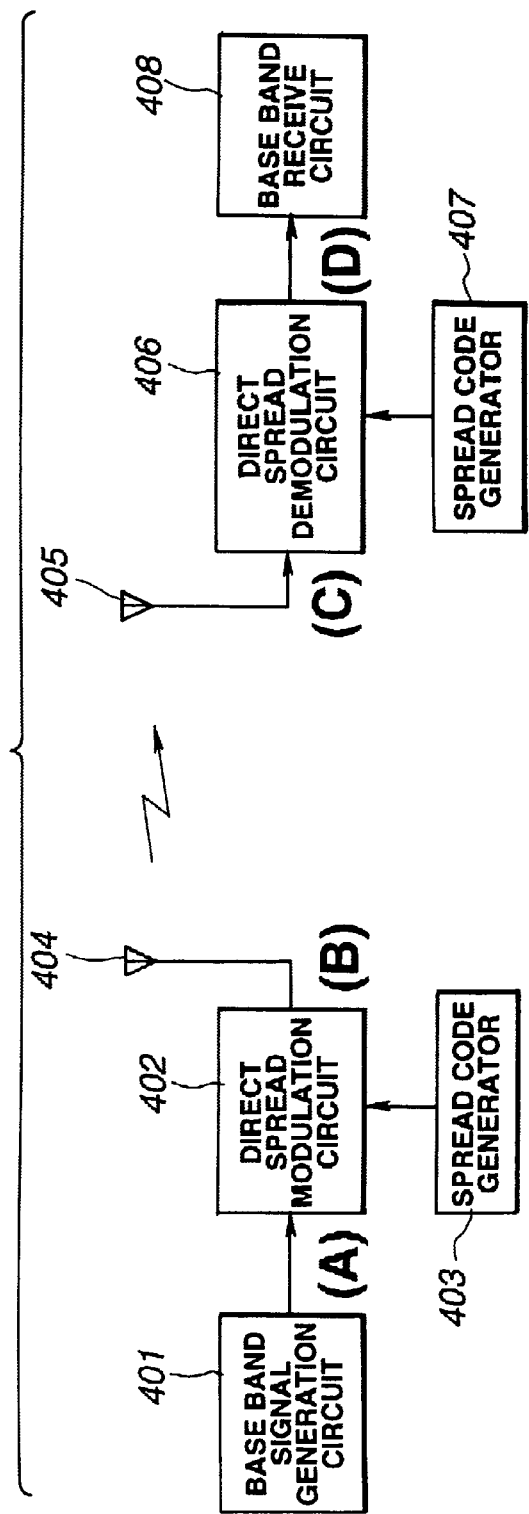

RECEIVER FOR SPECTRUM SPREAD COMMUNICATION SYSTEM

BACKGROUND OF THE INVENTION

This invention relates to a receiver for a spectrum spread communication system, and more particularly to a receiver for a spectrum spread communication system employing a direct spread modulation system.

In radio communication, it is often encountered that a radio wave generated from a transmit side arrives at an antenna on a receive side while taking the form of a plurality of incoming waves which have passed through a propagation path. Such a phenomenon is called multipath, which will be described hereinafter with reference to FIG. 5. In FIG. 5, reference numeral 101 designates a transmit antenna and 102 is a receive antenna. A radio wave transmitted from the transmit antenna 101 is received by the receive antenna 102, during which the receive antenna 102 receives both a direct wave sent thereto directly from the transmit antenna 101 through a propagation path 103 and an indirect wave sent thereto from the transmit antenna 101 through a propagation path 10 5 including reflection on a reflector 104. Actually, a wall surface of a building, a wall of a room and the like each act as the reflector 104. A plurality of indirect waves are propagated through such a propagation path 105. Such propagation of waves through a plurality of paths different in propagation time is generally referred to as "multipath" in the art.

Generation of multipath causes a variety of troubles. More particularly, in communication equipment for transmitting digital data such as radio data communication equipment, it causes a receive signal to be indefinite, leading to a failure in receive of the signal. Alternatively, it, even when the communication equipment receives the signal, causes a bit error rate (BER) to be deteriorated, leading to a deterioration in communication quality. In particular, fading due to multipath wherein a plurality of signals by multipath cancel each other to cause at least a part of a spectrum of the receive signal to be decreased in intensity gives rise to a serious problem.

Conventional approaches to such troubles due to multipath include (1) employment of a space diversity system by an antenna, (2) use of a waveform equalizer, (3) employment of a spectrum spread communication system, and the like.

Now, a space diversity system will be described with reference to FIG. 6. In FIG. 6, reference numerals 201, 202 and 203 each designate each of a plurality of antennas arranged in a manner to be spatially separated from each other. In the example shown in FIG. 6, three such antennas are arranged. 204 is an antenna switching unit and 205 is a receiver. In the space diversity system thus constructed, of the receive antennas 201 to 203 which are spatially separated from each other, the antenna increased in receive intensity is selected through the antenna switching unit 204, to thereby be connected to the receiver 205, resulting in ensuring stable receive.

Use of a waveform equalizer is carried out in such a manner as shown in FIG. 7. In FIG. 7, reference numeral 301 designates a receive antenna, 302 is a radiofrequency circuit, 303 is a waveform equalizer and 304 is a demodulation circuit. In a receiver thus constructed, a signal received by the receive antenna 301 is frequency-converted into an intermediate frequency in the radiofrequency circuit 302 and then input to the waveform equalizer 303. The waveform equalizer 303 acts as a circuit for permitting distortion of a waveform due to multipath which occurs in a signal propagation path to be corrected by means of a delay element, a variable weighting circuit or the like. It may be constituted by an A/D converter, a digital circuit or the like. The receive signal corrected in the waveform equalizer 303 is input to the demodulation circuit 304. At this time, the waveform equalizer 303 has already corrected the receive signal to a state at which it was transmitted, resulting in ensuring stable demodulation operation.

Now, a spectrum spread system will be described with reference to FIG. 8. In FIG. 8. reference numeral 401 designates a base band signal generation circuit, 402 is a direct spread modulation circuit, 403 is a spread code generator and 404 is a transmit antenna 404. The elements 401 to 404 cooperate with each other to provide a unit on a transmit side. Reference numeral 405 is a receive antenna, 406 is a direct spread demodulation circuit, 407 is a spread code generator and 408 is a base band receive circuit. The elements 405 to 408 cooperate with each other to constitute a unit on a receive side.

In the spectrum spread system thus constructed, the base band signal generation circuit 401 generates base band information to be transmitted. The base band information thus generated usually has such a spectrum as shown in (A) of FIG. 8. The spread code generator 403 generates a spread code sequence consisting of a pseudo noise (PN) code of a speed larger than the base band information and the like. The base band signal and spread code sequence thus generated are then input to the direct spread modulation circuit 402. so that the base band signal is modulated by the spread code sequence, resulting in a spread modulation signal which has a spectrum spread over such a wide band as shown in (B) of FIG. 8. The direct spread modulation signal is subject to carrier modulation such as PSK modulation. FSK modulation or the like in the direct spread modulation circuit 402 and then transmitted from the transmit antenna 404 toward the receive side.

The signal thus received by the receive antenna 405 on the receive side is input to the direct spread demodulation circuit 406. At this time, it is supposed that a spectrum of the receive signal is partially attenuated due to fading by multipath described above or the like, as shown in (C) of FIG. 8. The receive signal thus input through the receive antenna 405 while being subject to fading is demodulated in the direct spread demodulation circuit 406 and then correlated to a spread code sequence generated from the spread code generator 407 which is adapted to generate the same spread code sequence as the spread code generator 403 on the transmit side, so that a demodulation signal having such a spectrum as shown in (D) of FIG. 8 is output from the direct spread demodulation circuit 406. At this time, even when a part of the receive signal is attenuated as shown in (C) of FIG. 8, a whole spectrum of the receive signal is spread over a wide frequency band, to thereby minimize an influence of the attenuation on the receive signal. This substantially prevents the signal demodulated by the direct spread circuit 406 from being affected by fading. The signal thus demodulated is fed to the base band receive circuit 408, resulting in the base band signal being reproduced.

Unfortunately, each of the approaches described above exhibits its own disadvantages.

More particularly, in the space diversity system using the antennas shown in FIG. 6, a signal intensity detection circuit incorporated in the receiver 205 controls the antenna switching unit 204. to thereby select any desired one of the antennas. Thus, when the antenna switching unit 204 is controlled to carry out switching between the antennas at the time when the signal intensity detection circuit detects a decrease in intensity of the receive signal due to fading, reaction time required for the switching is increased because there is a signal delay due to circuits and filters between an end of the antenna and the signal intensity detection circuit, resulting in the receive signal being deteriorated between the detection and the switching. This causes a radio data communication equipment or the like to exhibit a disadvantage that data received between the detection and the switching contain an error.

The approach of FIG. 7 using the waveform equalizer is complicated in setting of a tap coefficient and calculation of a correction level. Also, it requires a logic circuit of an advanced grade, a digital filter to which a digital signal processor (DSP) is applied and the like in order to realize the setting and calculation. Further, it renders restoration of the receive signal impossible when an intensity of the spectrum is deteriorated to a level sufficient to render the correction impossible or an intensity of the signal is reduced to a level below a receive intensity limit.

Also, use of the spectrum spread system shown in FIG. 8 fails to eliminate the above-described disadvantages due to fading by multipath when a large part of the spectrum directly spread by spectrum spread or a whole thereof falls in due to fading or a length of the spread code sequence is reduced.

SUMMARY OF THE INVENTION

The present invention has been made in view of the foregoing disadvantage of the prior art.

Accordingly, it is an object of the present invention to provide a receiver for a spectrum spread communication system which is capable of substantially preventing a deterioration in receive quality due to fading in circumstances under which mutipass occurs.

In accordance with the present invention, a receiver for a spectrum spread communication system employing a direct spread modulation system is provided. The receiver includes a plurality of receive antennas arranged so as to be spaced from each other at predetermined intervals, a plurality of receiver circuits arranged in correspondence to the receive antennas, respectively, a signal intensity measurement means for sampling a signal of each of the receiver circuits at a speed set to be n (n: an integer) times as large as one chip of a spread code sequence thereof, and a path switching circuit for selecting one of the output signals of the receiver circuits depending on results of measurement of the signal intensity measurement means to feed it to a demodulation circuit.

BRIEF DESCRIPTION OF THE DRAWINGS

These and other objects and many of the attendant advantages of the present invention will be readily appreciated as the same becomes better understood by reference to the following detailed description when considered in connection with the accompanying drawings; wherein:

FIG. 8 is a schematic view showing a spectrum spread communication system of the direct spread type.

DETAILED DESCRIPTION OF THE PREFERRED EMBODIMENTS

Figure 1:
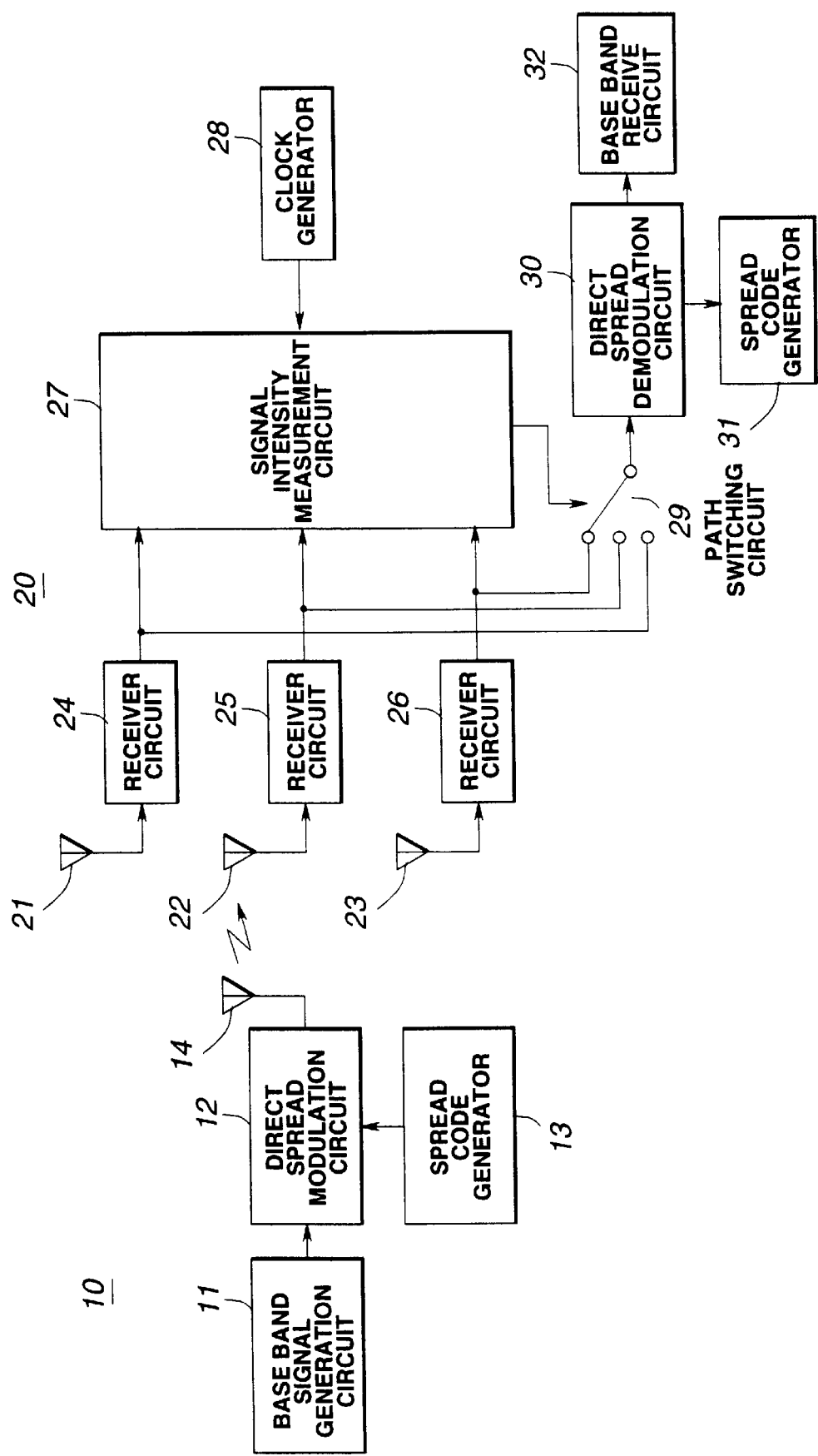
FIG. 1 is a block diagram showing an embodiment of a receiver for a spectrum spread communication system according to the present invention.

Now, a receiver for a spectrum spread communication system according to the present invention will be described hereinafter with reference to FIGS. 1 to 4. wherein like reference numerals designate like or corresponding parts throughout.

Referring first to FIG. 1, an embodiment of a receiver for a spectrum spread communication system according to the present invention is illustrated. In FIG. 1. reference numeral 10 designates a unit on a transmit side, which includes a base band signal generation circuit 11, a direct spread modulation circuit 12, a spread code generator 13 and a transmit antenna 14. The elements 11 to 14 of the transmit side unit 10 may be constructed in the same manner as the base band signal generation circuit 401, direct spread demodulation circuit 402, spread code generator 403 and transmit antenna 404 described above with reference to FIG. 8, respectively. The transmit side unit 10 thus constructed transmits a signal which has been subject to spectrum spread.

Figure 6:
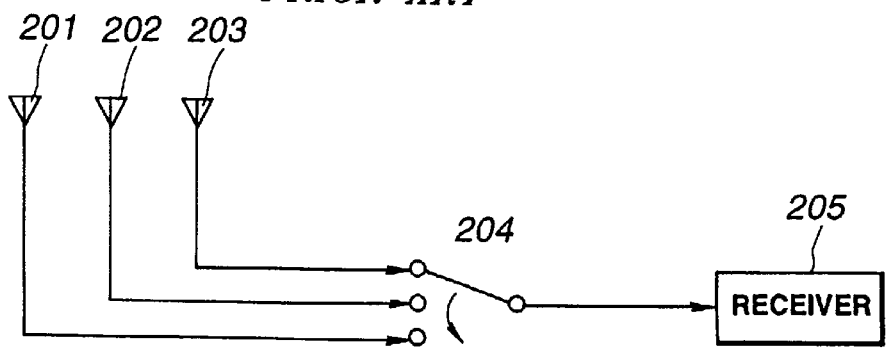
FIG. 6 is a schematic view showing space diversity using antennas.
Figure 7:
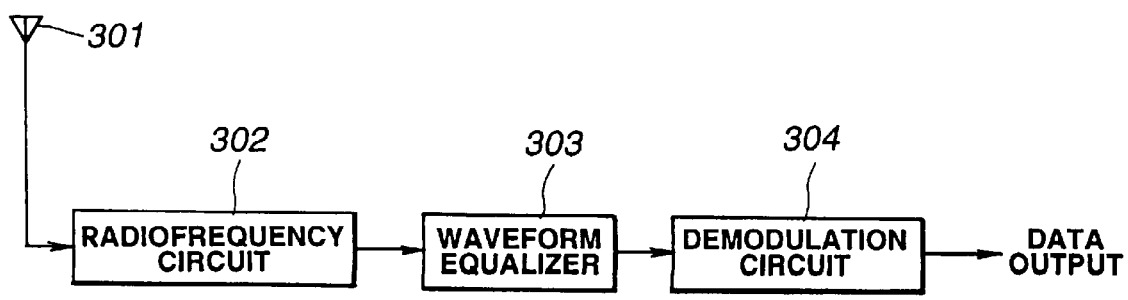
FIG. 7 is a schematic view showing use of a waveform equalizer.

Reference numeral 20 designates a unit on a receive side, which includes receive antennas 21, 22 and 23, receiver circuits 24, 25 and 26, a signal intensity measurement circuit 27, a clock generator 28, a path switching circuit 29, a direct spread demodulation circuit 30, a spread code generator 31 and a base band receive circuit 32. The receive antennas 21, 22 and 23 are arranged in a manner to be spaced from each other at predetermined intervals like the receive antennas 201, 202 and 203 described above with reference to FIG. 6.

In the receive side unit 20 thus constructed, signals input through the receive antennas 21, 22 and 23 thereto are fed to the receiver circuits 24, 25 and 26 corresponding thereto, respectively. The receiver circuits 24 to 26 each may be constructed in the same manner.

Figure 2:
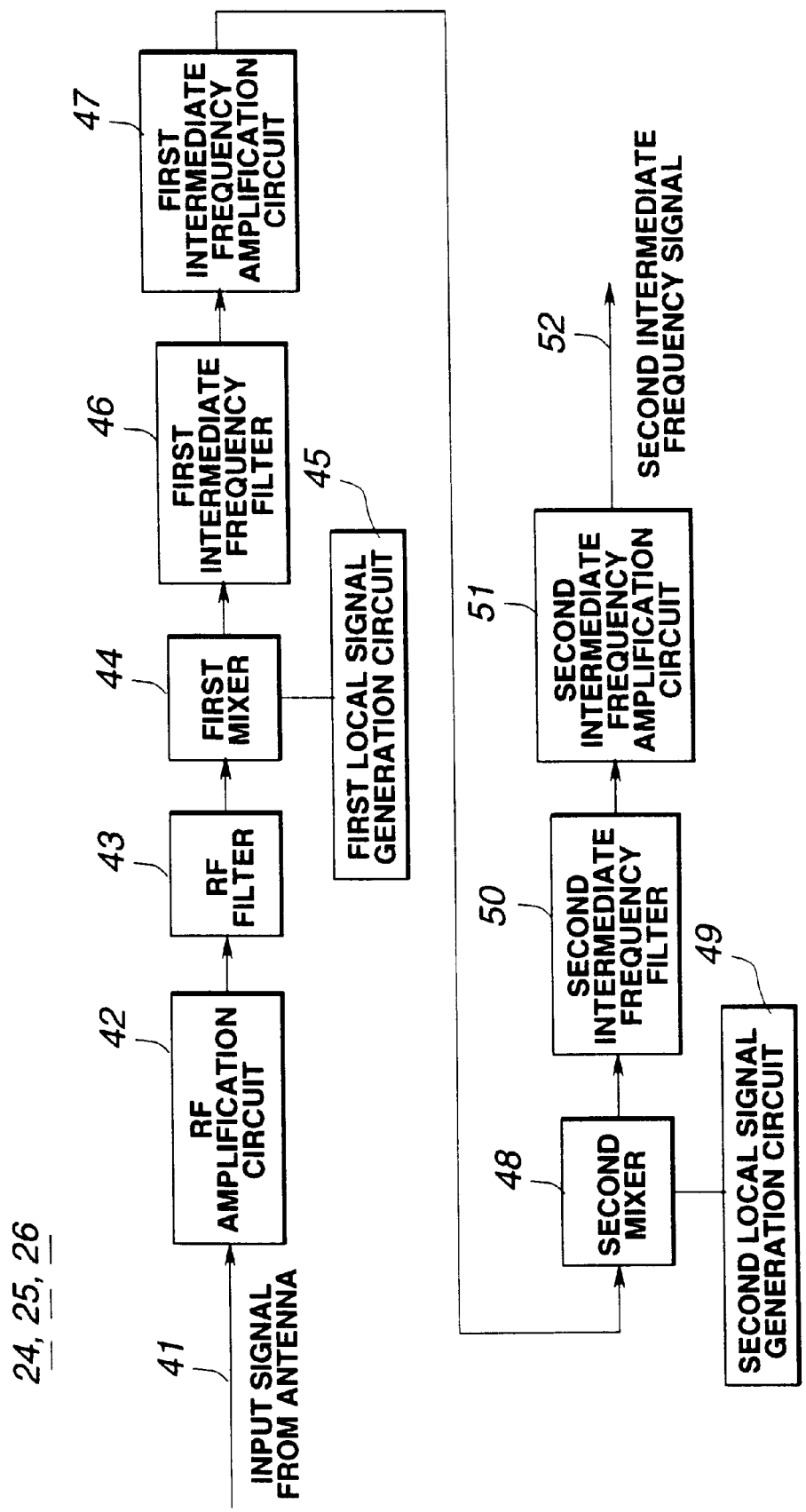
FIG. 2 Is a block diagram showing each of receiver circuits incorporated in the receiver of FIG. 1.

The receiver circuits 24, 25 and 26 each may be constructed in such a manner as shown in FIG. 2. More particularly, in FIG. 2, reference numeral 41 designates a signal input through each of the receive antennas 21, 22 and 23, 42 is a radiofrequency amplification circuit, 43 is a radiofrequency filter, 44 is a first mixer, 45 is a first local signal generation circuit, 46 is a first intermediate frequency filter, 47 is a first intermediate frequency amplification circuit, 48 is a second mixer, 49 is a second local signal generation circuit, 50 is a second intermediate frequency filter, 51 is a second intermediate frequency amplification circuit, and 52 is a second intermediate frequency signal which is an output of the receiver circuit.

In the receiver circuit 24, 25 or 26 thus constructed, the signal 41 input through the receive antenna 21, 22 or 23 thereto is subject to radiofrequency amplification in the radiofrequency amplification circuit 42 and then fed to the radiofrequency filter 43, in which any noise component is removed from the signal 41, followed by feed of the signal to the first mixer 44. The signal thus output from the radiofrequency filter 43 is subject to frequency conversion in the first mixer 44 by means of a first local oscillation signal oscillated by the first local signal generation circuit 45, to thereby provide a first intermediate frequency signal. The first intermediate frequency signal thus outputted passes through the first intermediate frequency filter 46 and then is amplified in the first intermediate frequency amplification circuit 47. The first intermediate frequency signal thus amplified is then fed to the second mixer 48, in which it is subject to frequency conversion by means of a second local oscillation signal fed from the second local signal generation circuit 49, resulting in a second intermediate frequency signal being provided. The signal thus output from the second mixer passes through the second intermediate frequency signal and then is amplified in the second intermediate frequency amplification circuit 51, to thereby be output in the form of the second intermediate frequency signal 52 therefrom.

Thus, the signals input through the receive antennas 21, 22 and 23 are subject to frequency conversion and amplification in the corresponding receiver circuits 24, 25 and 26, respectively, resulting in the second intermediate frequency signal being output from each of the receiver circuits. The signal thus output from each of the receiver circuits 24 to 26 is then fed to the signal intensity measurement circuit 27, as well as the.path switching circuit 29.

The signal intensity measurement circuit 27 carries out, in response to a sampling clock generated from the clock generator 28, sampling of the second intermediate frequency signal fed thereto from each of the receiver circuits 24 to 26 to measure an intensity of the signal, resulting in feeding a selection signal to the path switching circuit depending on results of the measurement. The clock signal output from the clock generator 28 has a frequency set to be n (n: an integer) times as large as a length of one bit (or a length of one chip) of a spread code sequence and sampling operation Is carried out a plurality of times per one chip in the signal intensity measurement circuit 27. The details will be described hereinafter with reference to FIG. 3.

Figure 3:
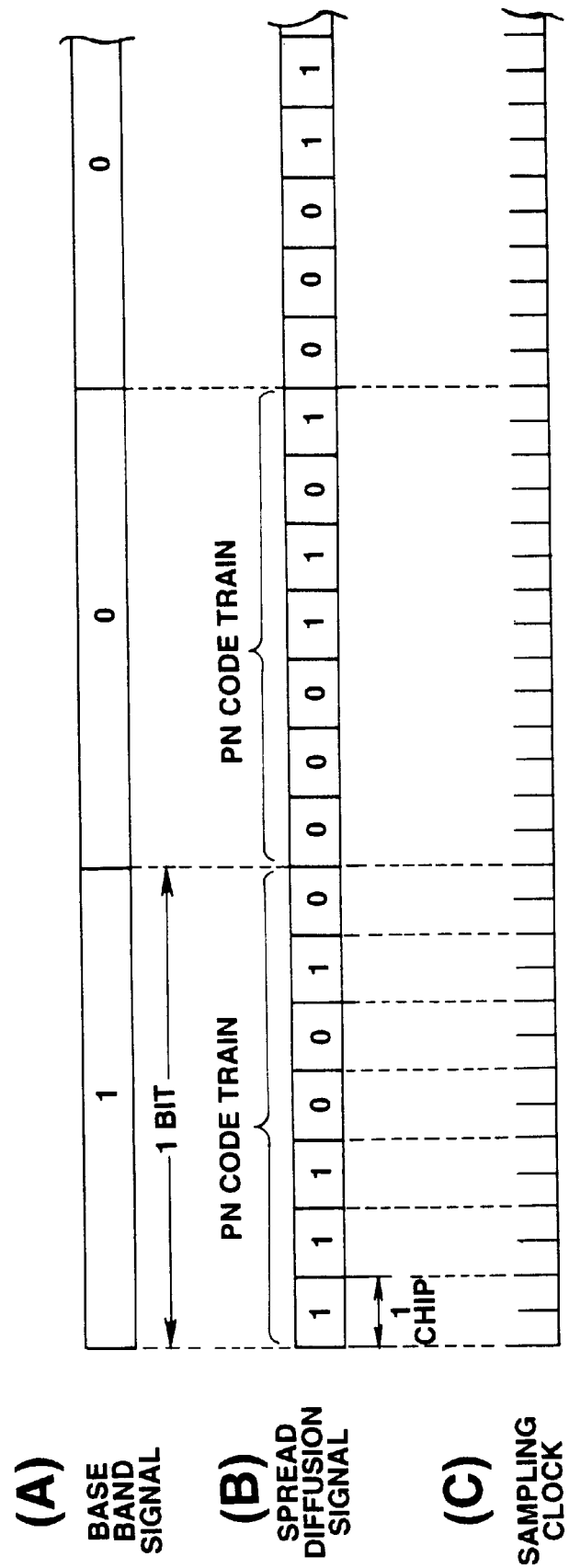
FIG. 3 is a diagrammatic view showing signals in the receiver of FIG. 1.

In FIG. 3. (A) shows an example of a base band signal and (B) shows an example of a spread modulation signal obtained by modulating the base band signal by means of a spread code sequence constituted by a PN code train. As shown in FIG. 3, the spread modulation signal (B) is prepared by corresponding the PN code train of a predetermined number of bits to "0" and "1" values of each of bits of the base band signal (A). One bit of the PN code train is named one chip, resulting in being discriminated from one bit of the bass band signal. Also, in the example shown In FIG. 3. the PN code train of a series of seven bits is allocated to one bit of the base band signal. However, the present invention is not limited to such construction. Thus, the spread code sequence may have any desired number of bits other than seven bits.

In FIG. 3, (C) indicates an example of a sampling clock generated by the clock generator 28. As shown in (C) of FIG. 3, the clock has a frequency set to be n (n: an integer) times as large as one chip of the PN code train. In the example, the frequency is set to be two times. Thus, in the signal intensity measurement circuit 27, the intermediate frequency signal output from each of the receiver circuits 24 to 26 is sampled a plurality of times per one chip, resulting in an intensity of the signal being measured. In the example, the sampling is carried out two times. Measurement of the signal intensity may be attained by sampling the intermediate frequency signals from the receiver circuits 24 to 26 in parallel when inputting of the sampling clock is carried out. Alternatively, it may be accomplished by subjecting a cycle of the sampling clock to time sharing to sample the outputs of the receiver circuits in order when input of the sampling clock is carried out.

An intensity of each of the intermediate frequency signals is thus measured and the path switching circuit 29 is fed with a selection signal so that of the outputs of the receiver circuits 24, 25 and 26. one of the largest intensity may be selected. The intermediate frequency signal of one of the receiver circuits 24, 25 and 26 thus selected is fed through the path switching circuit 29 to the direct spread demodulation circuit 30.

The direct spread demodulation circuit 30, spread code generator 31 and base band receive circuit 32 may be constructed in substantially the same manner as the direct spread demodulation circuit 406, spread code generator 407 and base band receive circuit 408 described above with reference to FIG. 8. respectively; thus, a base band signal is reproduced in substantially the same manner as described above.

Thus, an optimum path signal may be obtained at the time when the intermediate frequency signal is fed to the direct spread demodulation circuit 30, so that stable demodulation operation may be carried out in the direct spread demodulation circuit 30. In particular, the illustrated embodiment is so constructed that selection of the output signals of the receiver circuits 24 to 26 provided on a plurality of paths is carried out while discriminating an intensity of each of the signals. resulting in eliminating dead time due to a delay of propagation as encountered in the prior art. Also, in the illustrated embodiment, the sampling is carried out at a cycle smaller than the spread code to determine the signal intensity, to thereby minimize a delay in switching of the paths or reduce the delay to a level corresponding to one chip at most. Also, even when an error occurs in data of one chip, it is substantially prevented from causing any bit error in the base band signal during the demodulation because the one chip indicates ones chip in the PN code train of a predetermined number of bits which corresponds to one bit of the base band signal.

Figure 4:
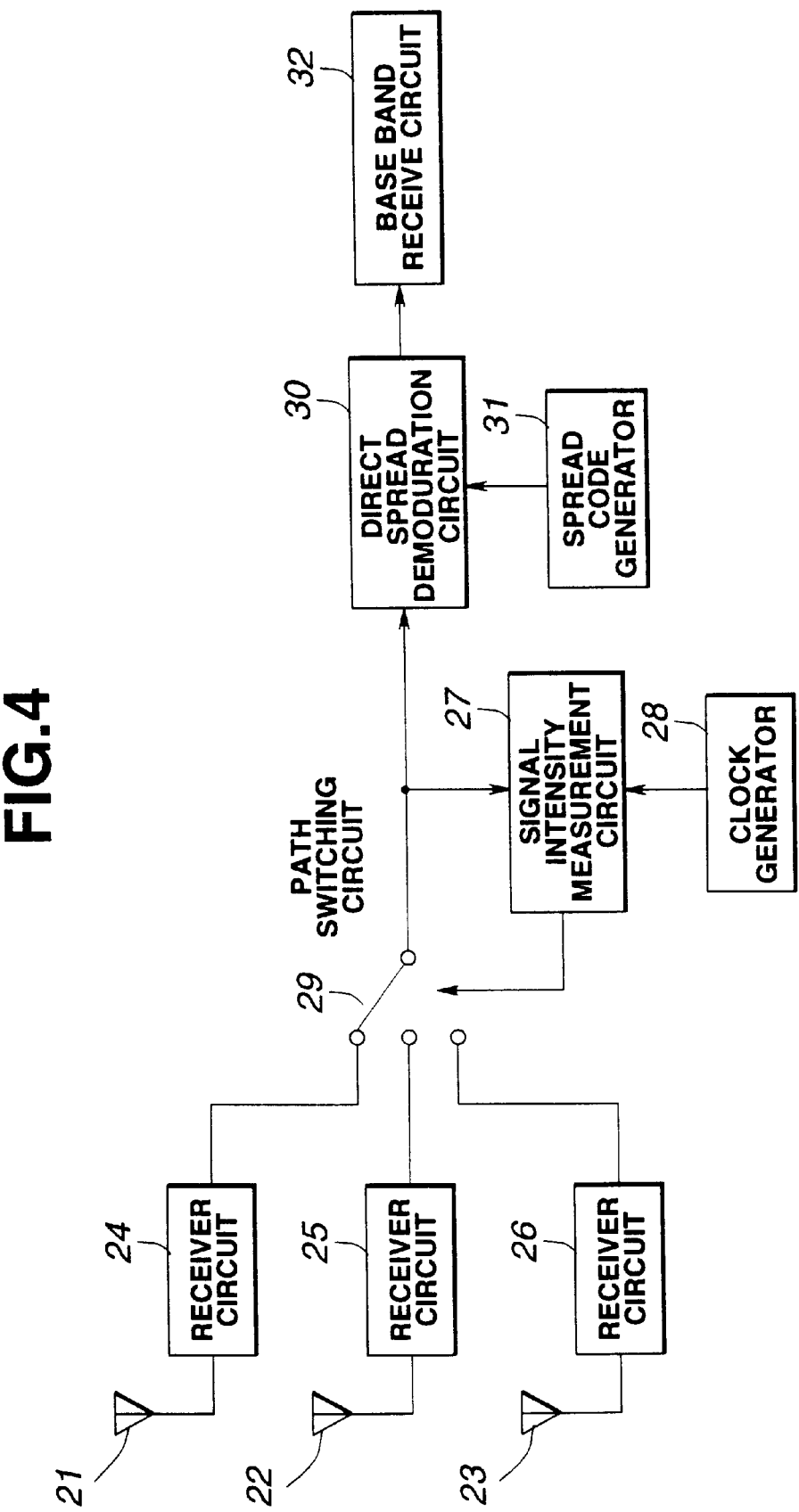
FIG. 4 is a block diagram showing another embodiment of a receiver for a spectrum spread communication system according to the present invention.
Figure 5:
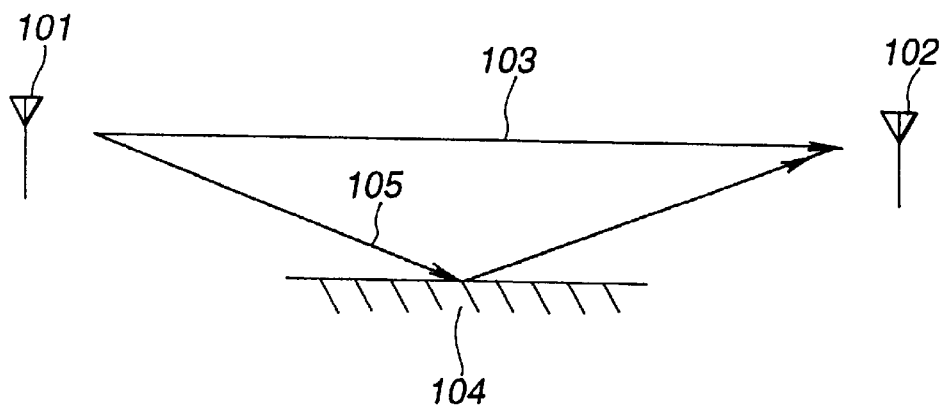
FIG. 5 is a schematic view showing multipath.

Referring now to FIG. 4, another embodiment of a receiver for a spectrum spread communication system according to the present invention is illustrated. In FIG. 4, reference numeral 20' designates a unit on a receive side, which may be constructed in substantially the same manner as the receive side unit 20 in the embodiment described above. More specifically. the receive side unit 20' includes receive antennas 21, 22 and 23, receiver circuits 24. 25 and 26, a signal intensity measurement circuit 27, a clock generator 28, a path switching circuit 29, a direct spread demodulation circuit 30, a spread code generator 31, and a base band receive circuit 32, which may be constructed in substantially the same manner as in the embodiment described above with reference to FIG. 1. In the illustrated embodiment, the path switching circuit 29 is arranged in the form of a pre-element in the receive side unit 20', so that a level of a second intermediate frequency signal selected by the path switching circuit 29 may be measured through the signal intensity measurement circuit 27, resulting in the path switching circuit 29 being changed over when the intensity measured is at a predetermined level or below. The receive side unit 20' in the illustrated embodiment is different in such construction from the unit 20 in the embodiment of FIG. 1. Such construction likewise permits the intermediate frequency signal to be a signal selected through an optimum path at the time when it is input to the direct spread demodulation circuit 30, resulting in ensuring stable demodulation operation as in the embodiment shown in FIG. 1.

In each of the embodiments described above, the receiver circuits each are constructed in a double superheterodyne manner. However, the present invention is not limited to such construction. The receiver circuits each may be constructed in any desired way so long as it provides the intermediate frequency signal intended.

Also, in each of the embodiments described above, three such receive antennas and receiver circuits are arranged by way of example, however, the present invention is not limited to such arrangement. The present invention merely requires two or more such receive antennas and receiver circuits.

As can be seen from the foregoing, the present invention permits the intermediate frequency signal to be in the form of a signal selected through an optimum path already at the time when it is input to the direct spread demodulation circuit, resulting in stable demodulation operation being accomplished in the direct spread demodulation circuit.

Also. the present invention permits selection of desired one of the paths to be carried out before input of the signal to the direct spread demodulation circuit, to thereby substantially eliminate any influence of a delay of the signal between the input terminal of the antenna and the second intermediate frequency, so that any dead time due to the delay may be prevented.

Further, in the present invention, measurement of the signal intensity is carried out by means of the sampling clock having a frequency n (n: an integer) times as large as the chip frequency, resulting in optimum path selection being rapidly carried out at a speed of one chip length or less. Therefore, path switching can be attained in a period highly reduced as compared with a length of the spread code sequence, to thereby advantageously reduce a deterioration in processing gain corresponding to time required for the switching. Thus, the advantages of the present invention are effectively exhibited even when a length of the spread code is reduced.

While preferred embodiments of the present invention have been described with a certain degree of particularity with reference to the drawings, obvious modifications and variations are possible in light of the above teachings. It is therefore to be understood that within the scope of the appended claims, the invention may be practiced otherwise than as specifically described.

What is claimed is:

1. A receiver in a spread spectrum communication system employing direct spread modulation, comprising:

a plurality of receive antennas spaced from each other at predetermined intervals;

a plurality of receiver circuits arranged in correspondence to said receive antennas respectively and configured to receive a transmitted spread spectrum signal and output respective output signals, said transmitted spread spectrum signal having been spread with a spread code sequence at a transmitter;

signal intensity measurement means for measuring at each of said plurality of receiver circuits a signal intensity of said transmitted spread spectrum signal, prior to being despread, comprising means for sampling said transmitted spread spectrum signal at each of said receiver circuits at a speed set to be n times as large as one chip of the spread code sequence, where n is an integer, said signal intensity measuring means for measuring the signal intensity based on one or more samples that span less than a time interval for said chip; and a path switching circuit configured to select a selected output signal from one of the output signals of said receiver circuits depending on measurement results from said signal intensity measuring means and configured to provide said selected output signal to a demodulation circuit.

2. A receiver in a spread spectrum communication system employing direct sequence spread spectrum signaling, comprising:

means for receiving a transmitted spread spectrum signal at plural predetermined locations spaced apart at predetermined intervals, said transmitted spread spectrum signal being spread with a spread code sequence at a transmitter;

means for receiving the transmitted spread spectrum signal at each of the plural predetermined locations and for providing respective output signals;

signal intensity measurement means for measuring a signal intensity of said transmitted spread spectrum signal, prior to being despread, as received by said means for receiving at each of said plural locations, having means for sampling said transmitted spread spectrum signal, as received by said means for receiving, at a sampling speed of n times as large as one chip of the spread code sequence, where n is an integer, said signal intensity measuring means for measuring the signal intensity based on one or more samples that span less than a time interval for said chip; and means for selecting a selected output signal from one of the output signals of said means for receiving depending on results of measurement of said signal intensity measuring means and for providing said selected output signal to a demodulation circuit.

* * * * *